(12) United States Patent
Cigal et al.

(10) Patent No.: US 10,920,616 B2
(45) Date of Patent: Feb. 16, 2021

(54) INTEGRAL GUTTER AND FRONT CENTER BODY

(71) Applicant: United Technologies Corporation, Hartford, CT (US)

(72) Inventors: Brian P. Cigal, Windsor, CT (US); Todd A. Davis, Tolland, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 563 days.

(21) Appl. No.: 14/911,565

(22) PCT Filed: Aug. 20, 2014

(86) PCT No.: PCT/US2014/051810
§ 371 (c)(1),
(2) Date: Feb. 11, 2016

(87) PCT Pub. No.: WO2015/026899
PCT Pub. Date: Feb. 26, 2015

(65) Prior Publication Data
US 2016/0186608 A1 Jun. 30, 2016

Related U.S. Application Data

(60) Provisional application No. 61/868,135, filed on Aug. 21, 2013.

(51) Int. Cl.
*F01D 25/18* (2006.01)
*F02C 7/36* (2006.01)
(Continued)

(52) U.S. Cl.
CPC ............... *F01D 25/18* (2013.01); *F01D 5/02* (2013.01); *F01D 25/243* (2013.01); *F02C 3/04* (2013.01);
(Continued)

(58) Field of Classification Search
CPC .......... F01D 25/18; F01D 25/243; F01D 5/02; F02C 3/04; F02C 7/36; F16N 31/00;
(Continued)

(56) References Cited

U.S. PATENT DOCUMENTS 5,107,676 A * 4/1992 Hadaway ................. F01D 25/18
184/6.11
6,223,616 B1 * 5/2001 Sheridan ............... F16H 1/2827
184/6.12

(Continued)

OTHER PUBLICATIONS

International Preliminary Report on Patentability for International Application No. PCT/US2014/051810 dated Mar. 3, 2016.

(Continued)

*Primary Examiner* — Craig Kim
(74) *Attorney, Agent, or Firm* — Carlson, Gaskey & Olds, P.C.

(57) ABSTRACT

A fan drive gear system for a turbofan engine is disclosed and includes a gear assembly and a front center body. The front center body is an annular case that supports the gear assembly. The front center body includes a passage portion that defines a portion of a core flow path, a forward flange configured for attachment to a first case structure forward of the front center body, and gutter portion disposed on a radially inner side of the front center body for collecting lubricant exhausted from the geared assembly.

6 Claims, 5 Drawing Sheets

(51) Int. Cl.
*F16N 31/00* (2006.01)
*F01D 5/02* (2006.01)
*F01D 25/24* (2006.01)
*F02C 3/04* (2006.01)
*F04D 29/32* (2006.01)

(52) U.S. Cl.
CPC .............. *F02C 7/36* (2013.01); *F04D 29/325* (2013.01); *F16N 31/00* (2013.01); *F05D 2220/36* (2013.01); *F05D 2240/35* (2013.01); *F05D 2250/191* (2013.01); *F05D 2260/98* (2013.01)

(58) Field of Classification Search
CPC ............. F05D 2220/36; F05D 2240/35; F05D 2250/191; F05D 2260/98
See application file for complete search history.

(56) References Cited

U.S. PATENT DOCUMENTS

| | | | |
|---|---|---|---|
| 7,591,754 B2 * | 9/2009 | Duong | F16D 3/72 475/347 |
| 7,765,787 B2 | 8/2010 | Eleftheriou et al. | |
| 7,797,922 B2 | 9/2010 | Eleftheriou et al. | |
| 7,878,303 B2 | 2/2011 | Munson | |
| 8,020,665 B2 * | 9/2011 | Sheridan | F01D 25/18 184/6.12 |
| 8,246,503 B2 * | 8/2012 | Sheridan | F02C 7/06 184/6.12 |
| 8,381,878 B2 | 2/2013 | DiBenedetto | |
| 8,398,517 B2 * | 3/2013 | McCune | F01D 25/166 475/159 |
| 8,484,942 B1 | 7/2013 | McCune et al. | |
| 8,585,538 B2 * | 11/2013 | Sheridan | F01D 25/18 475/346 |
| 8,939,864 B2 * | 1/2015 | McCune | F01D 5/027 475/331 |
| 2010/0212281 A1 | 8/2010 | Sheridan | |
| 2010/0324899 A1 | 12/2010 | Yamabana | |
| 2011/0108360 A1 | 5/2011 | DiBenedetto | |
| 2012/0263578 A1 * | 10/2012 | Davis | F02C 3/113 415/122.1 |
| 2012/0324899 A1 | 12/2012 | DiBenedetto et al. | |
| 2015/0361810 A1 * | 12/2015 | McCune | F01D 25/18 60/39.08 |
| 2016/0097331 A1 * | 4/2016 | Venter | F01D 15/12 415/122.1 |

OTHER PUBLICATIONS

European Search Report for European Patent Application No. 14837780.7 dated Mar. 14, 2017.
International Search Report and Written Opinion for International Application No. PCT/US2014/051810 dated Dec. 18, 2014.

* cited by examiner

INTEGRAL GUTTER AND FRONT CENTER BODY

REFERENCE TO RELATED APPLICATION

This application claims priority to U.S. Provisional Application No. 61/868,135 filed on Aug. 21, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Bearings supporting rotation of gears within the gear assembly require constant lubrication. The engines lubrication system provides lubricant during operation but may not provide a desired lubricant flow during some operating conditions. During operating conditions including momentary periods of zero or negative gravity, lubricant flow may be less than desired. An auxiliary lubricant system supplies lubricant during these momentary periods. The auxiliary lubricant system includes an auxiliary lubricant supply supplied from lubricant exhausted from the gear assembly. The exhausted lubricant is captured in a gutter arrangement surrounding the gear assembly and directed into the auxiliary supply. The gutter is an additional part that requires additional fabrication and assembly time and expense.

Turbine engine manufacturers continue to seek further improvements to engine assembly and performance including improvements that reduce expense, ease assembly and simplify maintenance.

SUMMARY

A turbofan engine according to an exemplary embodiment of this disclosure includes, among other possible things includes a turbine section, a geared architecture driven by the turbine section and a fan is driven by the turbine section through the geared architecture. A front-center unitary body supports the geared architecture and includes a gutter for gathering lubricant exhausted from the geared architecture. An auxiliary lubricant supply is in fluid communication with the gutter for receiving gathered lubricant.

In a further embodiment of the above turbofan engine, the auxiliary lubricant supply is defined within a first case structure and attached to the front center body.

In a further embodiment of the above turbofan engine, the gutter includes an outlet for communicating lubricant to the auxiliary lubricant supply. The outlet includes an extension configured to protrude into the auxiliary lubricant supply.

In a further embodiment of the above turbofan engine, the gutter includes an inlet for communicating lubricant from the auxiliary lubricant supply to an outlet passage defined within the gutter. The inlet includes an outlet extension that protrudes into the outlet passage of the gutter.

In a further embodiment of the above turbofan engine, the gutter abuts the first case structure without fasteners and communicates lubricant between the auxiliary lubricant supply and the gutter without seals.

In a further embodiment of the above turbofan engine, a compressor section and a combustor section are in fluid communication with the compressor section.

In a further embodiment of the above turbofan engine, the front center body defines a portion of a core flow path to the compressor section.

In a further embodiment of the above turbofan engine, the front center body includes an integrally formed web that extends inward to support the gutter proximate the geared architecture.

In a further embodiment of the above turbofan engine, the front center body and gutter form a single unitary case structure.

A front center body according to another exemplary embodiment includes a passage portion for defining a portion of a core flow path, a forward flange configured for attachment to a first case forward of the front center body and a gutter portion disposed on a radially inner side of the front center body. The passage portion and the gutter portion are continuous uninterrupted surfaces of the front center body.

In a further embodiment of the above, the gutter portion includes a first channel for gathering lubricant exhausted from a gear assembly and a second channel for exhausting lubricant from an auxiliary lubricant supply.

In a further embodiment of the above, the first channel includes an outlet extension that protrudes axially outward for extending into an opening in the first case for communicating lubricant to the auxiliary lubricant supply.

In a further embodiment of the above, the gutter is configured to surround a gear assembly supported within the front center body.

In a further embodiment of the above, a web portion extends between the passage portion and the gutter portion that is an integral structure of the front center body case.

A fan drive gear system for a turbofan engine according to an exemplary embodiment includes a gear assembly, a front center body supporting the gear assembly and a passage portion for defining a portion of a core flow path. A forward flange is configured for attachment to a first case structure forward of the front center body. A gutter portion is disposed on a radially inner side of the front center body. The passage portion and the gutter portion are continuous uninterrupted surfaces of the front center body.

In a further embodiment of the above, the first case structure includes an auxiliary lubricant supply and the gutter portion includes an outlet that extends axially forward into the first case structure for communicating captured lubricant from the gear assembly to the auxiliary lubricant supply.

In a further embodiment of the above, the gutter portion includes a first channel for gathering lubricant exhausted from the gear assembly and a second channel for exhausting lubricant from the auxiliary lubricant supply.

In a further embodiment of the above, the passage portion, the forward flange and the gutter portion comprise a continuous uninterrupted cross-section of the front center body.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
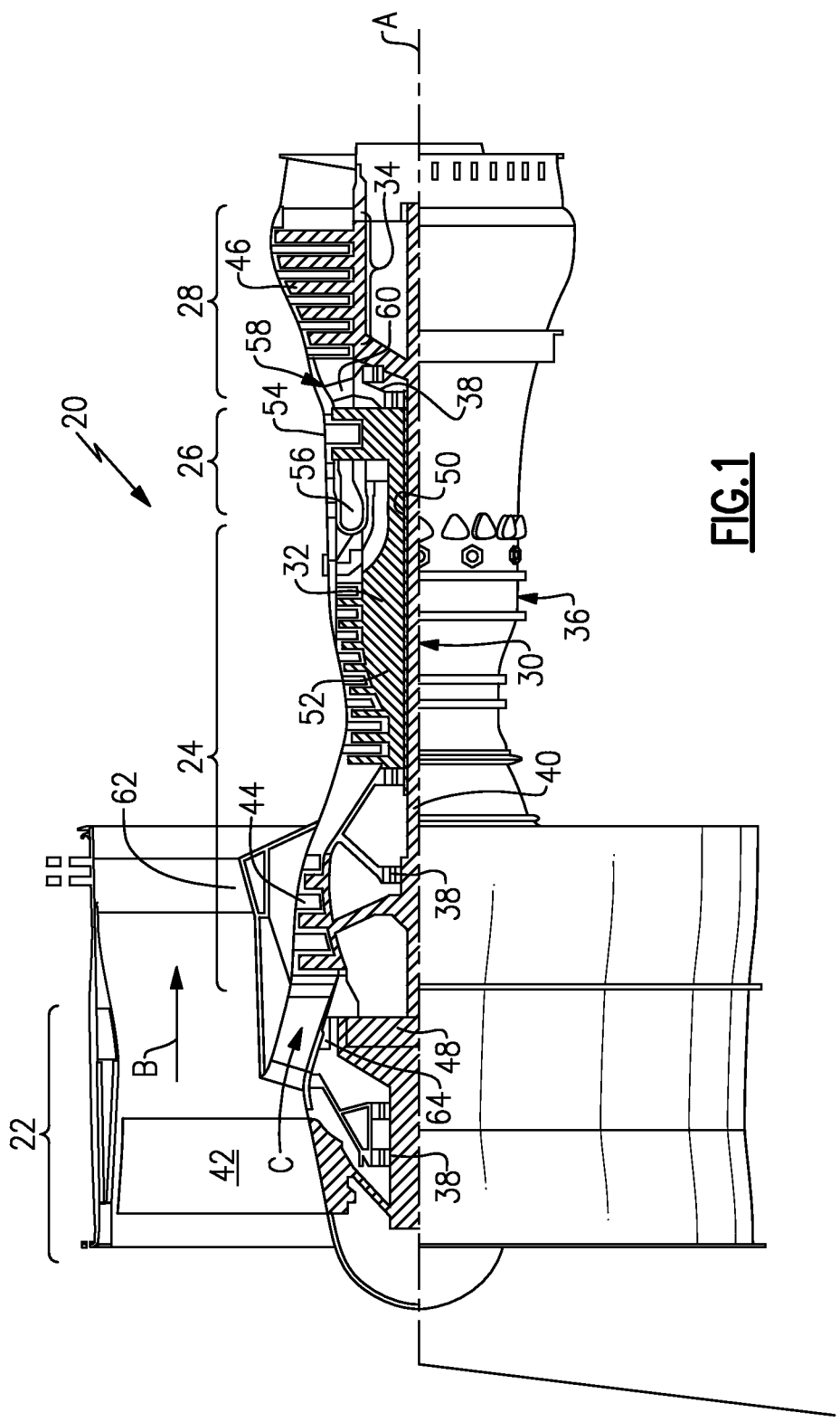
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
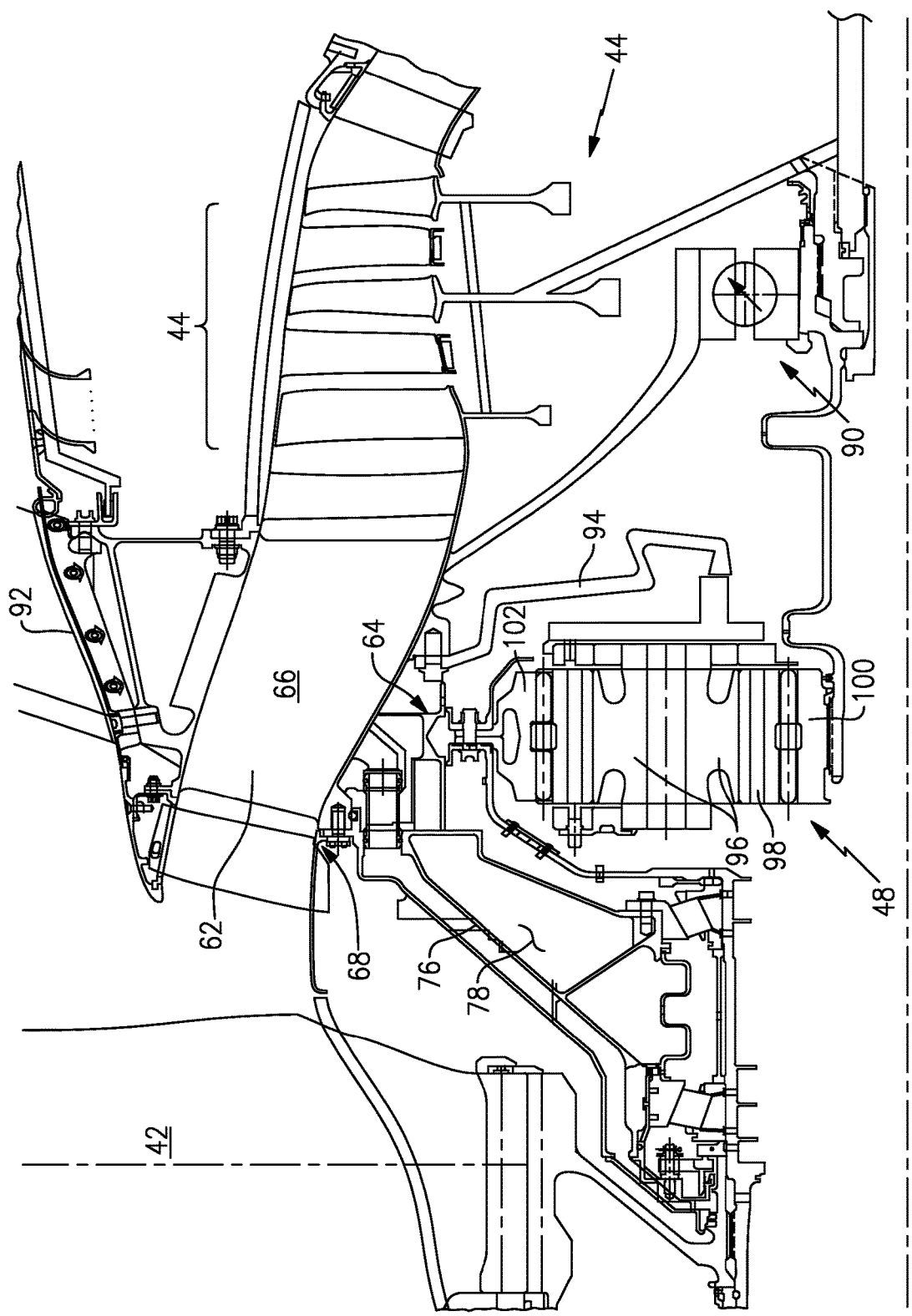
FIG. 2 is a cross-section of an example fan drive gear system.

Referring to FIG. 2 with continued reference to FIG. 1, the engine static structure 36 includes a front center body 62 that defines a portion of the core flow path C and also supports the geared architecture 48. The front center body 62 further includes a gutter portion 64 that diverts lubricant exhausted from the geared architecture 48 into an auxiliary lubricant supply 78 disposed within a first case structure 76. The first case structure 76 is attached to a forward flange 68 of the front center body 62.

The front center body 62 is an annular case structure and is a single unitary structure formed as one part that includes structural features supporting the geared architecture 48 and a forward bearing assembly 90. The forward bearing assembly 90 supports rotation of the inner shaft 40. The front center body 62 extends radially outward from the forward bearing assembly 90 to an outer surface to which portions of a core nacelle structure 92 may be attached.

A flex support 94 mounts to the front center body 62 for supporting the geared architecture 48. The geared architecture 48 requires a constant supply of lubricant to journal bearings 96 supporting rotation of intermediate gears 98. Moreover, gear mesh interfaces between the intermediate gears 98, a ring gear 102 circumscribing the intermediate gears 98 and a sun gear 100 driving the intermediate gears receive lubricant. Lubricant from the geared architecture 48 is exhausted radially outward and into the gutter portion 64 that surrounds the geared architecture 48. The example gutter portion 64 is an integral part of the front center body 62 and mates to the first case structure 76.

Figure 3:
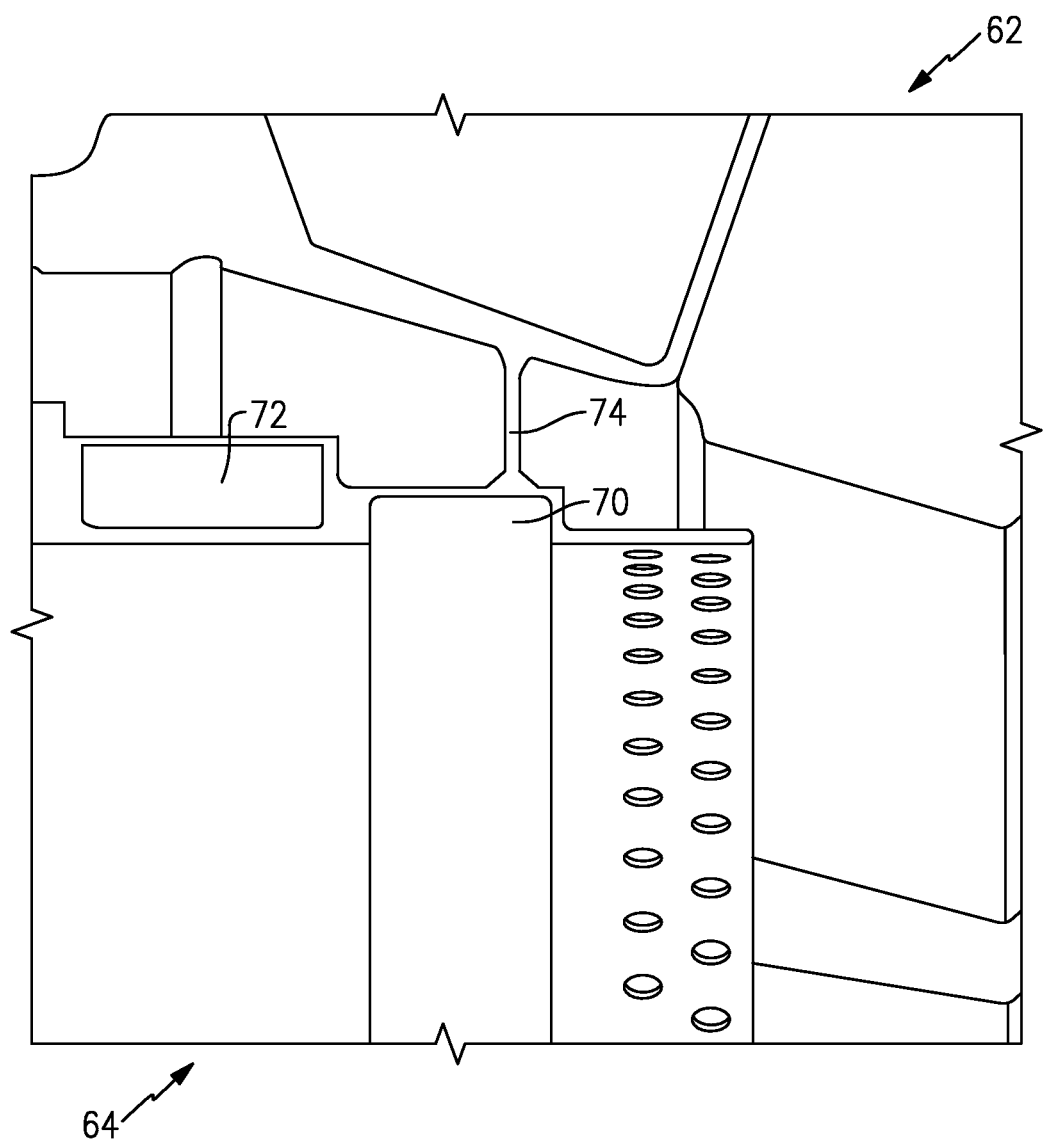
FIG. 3 is a cross-section of a portion of an example gutter portion of a front center body.

Referring to FIG. 3 with continued reference to FIG. 2, the gutter portion 64 includes a first channel 70 that accumulates lubricant exhausted radially outward from the geared architecture 48. Lubricant is driven circumferentially by windage generated by the rotating parts of the geared architecture 48 to pump lubricant circumferentially into a second channel 72 in communication with the auxiliary lubricant supply 78 within the first case structure 76. A web portion 74 extends from the passage portion 66 of the front center body 62 to support the gutter portion 64 proximate the geared architecture 48 and the first case structure 76.

Figure 4:
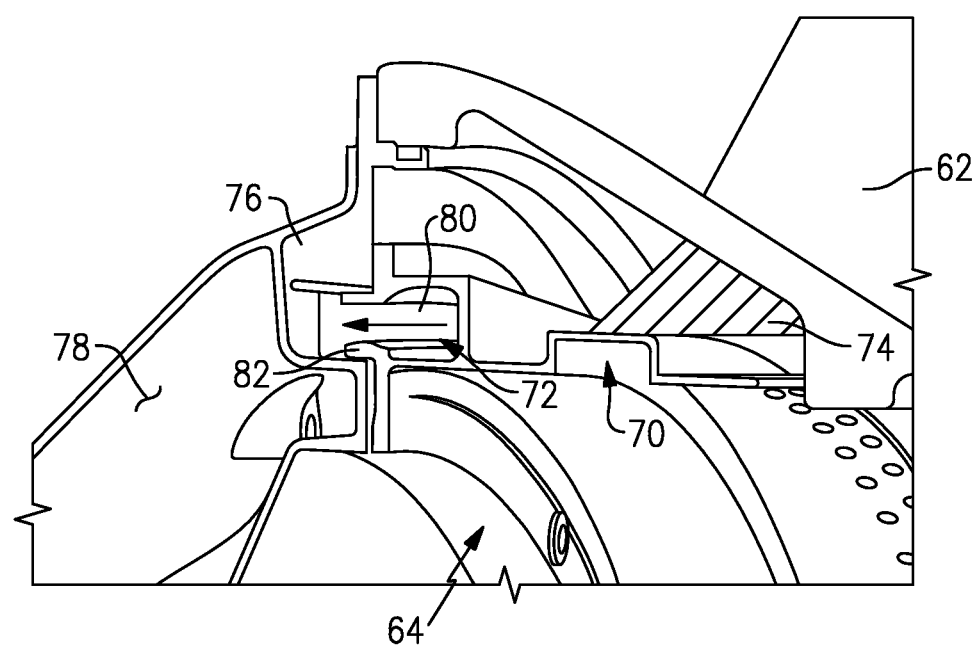
FIG. 4 is a perspective view of an outlet of an example gutter portion.
Figure 5:
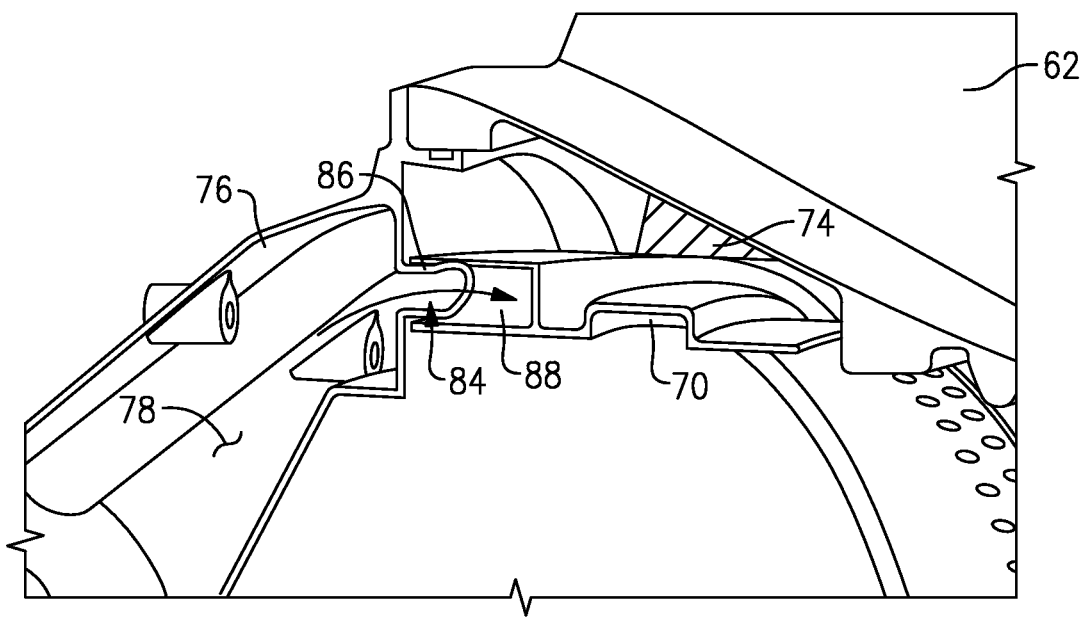
FIG. 5 is a perspective view of an outlet of an example first case structure.

Referring to FIGS. 4 and 5 with continued reference to FIG. 2, the gutter portion 64 abuts the first case structure 76 without fasteners and communicates lubricant with the auxiliary lubricant supply 78. Because fasteners are not utilized to provide a flow path between the gutter portion 64 and the auxiliary lubricant supply 78, an extended passage 82 is provided at an outlet 80 for lubricant flow. The extended passage 82 protrudes forward into the first case structure 76 to substantially prevent lubricant leakage. The extended passage 82 is substantially tubular in cross-section to define the outlet 80 into the auxiliary lubricant supply 78.

The first case structure 76 includes an aft extending passage 86 that protrudes into an exhaust passage 88 of the gutter portion 64. The aft extending passage 86 prevents leakage from lubricant overflow from the auxiliary lubricant supply 78. The aft extending passage is a substantially tubular in cross-section to define the exhaust passage 88. Accordingly, passage of lubricant between the gutter portion 64 and the first case structure is facilitated without complex seals. Moreover, the gutter portion 64 abuts the first case structure 76 without requiring additional fasteners.

Figure 6:
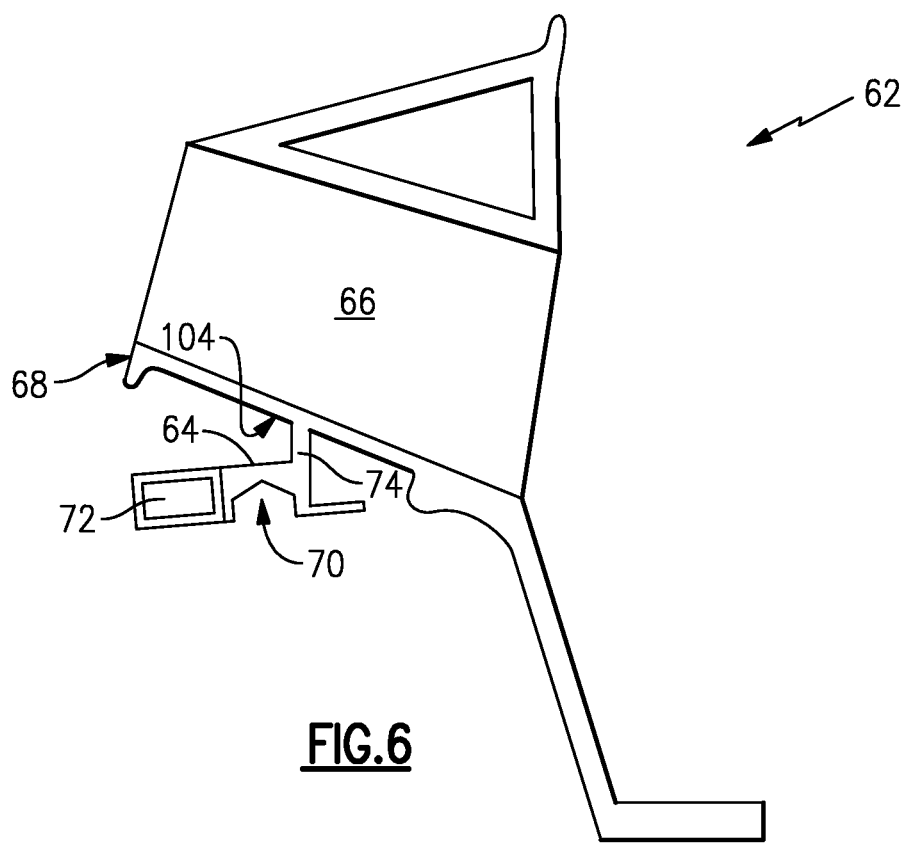
FIG. 6 is a cross-section of the example front center body with an integral gutter portion.

Referring to FIG. 6 with continued reference to FIG. 2, the front center body 62 is a continuous unitary structure that includes the passage portion 66, the forward flange 68 and the gutter portion 64. The passage portion 66 includes circumferentially spaced apart struts (not shown) around which airflow through the core airflow path C flows. The passage portion 66 provides a substantially annular path for airflow through the core airflow path C. The gutter portion 64 extends radially inward from an inner surface 104 of the passage portion 66. The gutter portion 64 is a continuous uninterrupted surface in cross-section of the front center body 62. The gutter portion 64 includes the first channel 70 for gathering lubricant exhausted from the geared architecture 48 and the second channel 72 for exhausting lubricant to the auxiliary lubricant supply 78.

Although the disclosed example does not include seals between the gutter portion and the auxiliary lubricant supply, seals may be utilized to prevent lubricant leakage during extreme maneuvering conditions, such as during negative or zero G maneuvers.

Accordingly, the disclosed front center body 62 includes the gutter portion 64 as an integral portion to eliminate seals and connections required when utilizing a separately installed gutter. Moreover, the front center body 62 defines a single unitary structure that provides a portion of the passage 66 and also includes the gutter portion 64 to simplify assembly and reduce complexity by eliminating an attachment flange and accompanying fasteners.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbofan engine comprising:
   a gear assembly; and
   a front center body supporting the gear assembly, the front center body comprises an annular case structure formed as one part, the front center body including a passage portion for defining a portion of a core flow path, a forward flange configured for attachment to a first case structure forward of the front center body and the gear assembly, a bearing support portion disposed aft of the gear assembly and a gutter portion disposed on a radially inner side of the front center body, wherein the passage portion and the gutter portion are continuous uninterrupted surfaces of the front center body, wherein the gutter portion includes a peak comprising a radially outermost point of the gutter portion about the entire annular surface accumulating lubricant.

2. The fan drive gear system as recited in claim 1, wherein the first case structure includes an auxiliary lubricant supply and the gutter portion includes an outlet extending axially forward into the first case structure for communicating captured lubricant from the gear assembly to the auxiliary lubricant supply.

3. The fan drive gear system as recited in claim 2, wherein the gutter portion includes a first channel for gathering lubricant exhausted from the gear assembly and a second channel for exhausting lubricant from the auxiliary lubricant supply.

4. The fan drive gear system as recited in claim 3, wherein the passage portion, the forward flange and the gutter portion comprise a continuous uninterrupted cross-section of the front center body.

5. The fan drive gear system as recite in claim 1, wherein the radially outermost point is disposed at a center of the gutter portion.

6. The fan drive gear system as recited in claim 1, wherein the front center body includes an integrally formed web portion extending inward to support the gutter portion proximate the gear assembly.

\* \* \* \* \*